United States Patent
Wang et al.

(10) Patent No.: US 6,469,089 B2
(45) Date of Patent: *Oct. 22, 2002

(54) ELASTOMERIC COMPOUNDS WITH IMPROVED WET SKID RESISTANCE AND METHODS TO IMPROVE WET SKID RESISTANCE

(75) Inventors: Meng-Jiao Wang, Lexington; Yakov Kutsovsky, Arlington; Steven R. Reznek, Concord; Khaled Mahmud, Natick, all of MA (US)

(73) Assignee: Cabot Corporation, Boston, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 73 days.

(21) Appl. No.: 09/415,357

(22) Filed: Oct. 8, 1999

(65) Prior Publication Data

US 2002/0132901 A1 Sep. 19, 2002

(51) Int. Cl.$^7$ ................................................ C08K 3/34
(52) U.S. Cl. ...................... 524/492; 524/493; 524/495; 524/496
(58) Field of Search ................. 524/492, 493, 524/495, 496

(56) References Cited

U.S. PATENT DOCUMENTS

| | | | | |
|---|---|---|---|---|
| 3,622,650 A | * | 11/1971 | Berstein et al. | 260/763 |
| 3,789,050 A | | 1/1974 | Loricchio et al. | 260/41.5 |
| 4,820,751 A | | 4/1989 | Takeshita et al. | 523/215 |
| 4,973,463 A | * | 11/1990 | Nakai | 723/445 |
| 5,321,072 A | * | 6/1994 | Misono | 524/496 |
| 5,500,482 A | | 3/1996 | Muraki et al. | 525/98 |
| 5,556,907 A | * | 9/1996 | Fuchs et al. | 524/493 |
| 5,641,820 A | | 6/1997 | Wideman et al. | 524/225 |
| 5,652,310 A | * | 7/1997 | Hsu et al. | 525/331.9 |
| 5,674,932 A | | 10/1997 | Agostini et al. | 524/430 |
| 5,830,930 A | | 11/1998 | Mahmud et al. | 523/215 |
| 5,859,115 A | * | 1/1999 | Rennar | 524/492 |
| 5,869,550 A | | 2/1999 | Mahmud et al. | 523/215 |
| 5,872,171 A | * | 2/1999 | Detrano et al. | 524/492 |
| 5,877,238 A | | 3/1999 | Mahmud et al. | 523/215 |
| 5,886,086 A | | 3/1999 | Hubbell et al. | |
| 5,900,029 A | | 5/1999 | Belmont et al. | 8/550 |
| 5,900,449 A | * | 5/1999 | Custodero et al. | 524/430 |
| 5,904,762 A | | 5/1999 | Mahmud et al. | 106/475 |
| 5,916,934 A | | 6/1999 | Mahmud et al. | 523/215 |
| 5,919,841 A | | 7/1999 | Mahmud et al. | 523/351 |
| 5,937,926 A | * | 8/1999 | Powell | 152/152.1 |
| 6,020,402 A | * | 2/2000 | Anand et al. | 523/212 |
| 6,090,880 A | * | 7/2000 | Zimmer et al. | 524/492 |

FOREIGN PATENT DOCUMENTS

| | | | | |
|---|---|---|---|---|
| EP | 0 732 362 A1 | 9/1996 | | C08L/21/00 |
| EP | 0 735 088 A1 | 10/1996 | | C08L/9/04 |
| EP | 0 829 511 A1 | 5/1997 | | C08K/9/02 |
| EP | 0 784 072 A1 | 7/1997 | | C08L/21/00 |
| EP | 0 796 891 A1 | 9/1997 | | C08K/5/54 |
| EP | 0 915 132 A1 | 5/1999 | | C08K/5/54 |
| EP | 0 931 812 A1 | 9/1999 | | C08K/9/04 |
| FR | 2 740 778 | 7/1995 | | C08L/9/00 |
| GB | 2 296 915 A | 1/1995 | | C09C/3/12 |

OTHER PUBLICATIONS

Roland Rauline, "Rubber Composition, Tires Having a Base of Said Composition and Method of Preparing Composition" Specification, pp. 1–28.

Ishikawa, et al. "Novel Processing Agents for Silica–filled Rubber", The Yokohama Rubber Co., Ltd. Research and Development Center, pp. 1–11.

* cited by examiner

*Primary Examiner*—Edward J. Cain

(57) ABSTRACT

An elastomeric composition is described which comprises at least one elastomeric component, at least one reinforcing filler, and at least one wet skid enhancing filler, for improving the wet skid resistance of the resultant composition. The wet skid enhancing filler is defined by a high Moh's hardness and large particle size. The resulting composition exhibits improved wet skid resistance compared to the same composition having no wet skid enhancing filler. Articles made from the elastomeric compositions are also described as well as methods of improving wet skid resistance and methods of making wet skid resistant materials.

49 Claims, No Drawings

ELASTOMERIC COMPOUNDS WITH IMPROVED WET SKID RESISTANCE AND METHODS TO IMPROVE WET SKID RESISTANCE

FIELD OF THE INVENTION

The present invention relates to improving wet skid resistance and more particularly to methods relating to improved wet skid resistance and elastomeric compounds exhibiting improved wet skid resistance properties. The present invention also relates to methods for preparing elastomeric compounds for enhancing wet skid resistance.

BACKGROUND OF THE INVENTION

Carbon blacks are widely used as reinforcing agents for elastomeric compounds. Silica is also used as a reinforcing agent for elastomers. However, using silica alone as a reinforcing agent for an elastomer can lead to poor performance compared to the results obtained with carbon black alone. When silica is combined with a silane coupling agent and an elastomer, the compound properties are significantly improved. When incorporated into vehicle tire tread compounds, such elastomeric compounds exhibit an improved balance of rolling resistance and wet skid resistance. Additionally, silicas with surface area between 100 and 250 $m^2/gm$ are conventionally used in order to get reinforcement. However, compounds containing silica as the primary reinforcing agent exhibit low thermal conductivity, high electrical resistivity, poor processability, and result in significant mechanical wear to the mixing equipment. Additionally, using pure silica as the reinforcing filler alone, leads to higher compound costs due to the correspondingly higher usage of the expensive coupling agent. Hence, silica is often used in blends with carbon black. Conventional blends of carbon black and silica lead to a poorer balance of wet skid and rolling resistance compared to using pure silica with the appropriate level of the coupling agent.

Accordingly, there is a need to develop methods of improving wet skid resistance without degrading other properties.

SUMMARY OF THE INVENTION

The present invention in part relates to an elastomeric composition exhibiting improved wet skid resistance. The composition may be useful in the manufacture of elastomeric materials, such as tires or portions thereof, hoses, belts, wiper blades, seals, gaskets, footwear, mats, and profile extrudates. The present invention also relates to methods of improving the wet skid resistance of an elastomeric composition including an elastomeric component and reinforcing fillers. The present invention relates, in part, to an elastomeric composition comprising at least one elastomeric component, at least one reinforcing filler and at least one wet skid enhancing filler.

The present invention further relates to a composition comprising:
a) at least one elastomeric component;
b) at least one wet skid enhancing filler with a Moh's hardness greater than about 4.5 and a BET surface area of less than about 100 $m^2/g$:
c) at least one reinforcing filler having a BET surface area of greater than or equal to about 80 $m^2/g$; and
d) at least one filler having a surface area of less than about 100 $m^2/g$, wherein b), c), and d) are different from each other.

Also, the present invention relates to a composition comprising:
a) at least one elastomeric component;
b) at least one wet skid enhancing filler with a Moh's hardness greater than about 4.5 and a BET surface are of less than about 100 $m^2/g$, wherein the filler is a non-aluminum containing filler; and
c) at least one reinforcing filler having a BET surface area of at least about 80 $m^2/g$, wherein the filler includes at least silica.

In addition, the present invention relates to a composition comprising:
a) at least one elastomeric component;
b) at least one wet skid enhancing filler with a Moh's hardness greater than about 4.5 and a BET surface area of less than about 100 $m^2/g$; and
c) at least one filler selected from 1) an aggregate comprising a silicon-containing species phase and a carbon phase; 2) an aggregate comprising a metal-containing species phase and a carbon phase; 3) a carbon product having attached at least one organic group; or 4) a silica-coated carbon black or combinations thereof.

Furthermore, the present invention relates to a composition comprising:
a) at least one elastomeric compound;
b) at least one type of silica having a BET surface area of less than 40 $m^2/g$; and
c) at least one reinforcing filler having a BET surface area of at least about 80 $m^2/g$.

Also, the present invention relates to a composition comprising:
a) at least one elastomeric component;
b) at least one wet skid enhancing filler with a Moh's hardness of greater than about 4.5 and a BET surface area of less than about 100 $m^2/g$, wherein the filler is a non-aluminum and non-silica containing filler; and
c) at least one reinforcing filler having a BET surface area of at least about 80 $m^2/g$.

It is to be understood that both the foregoing general description and the following detailed description are exemplary and explanatory only and are intended to provide further explanation of the present invention, as claimed.

DETAILED DESCRIPTION OF THE INVENTION

The present invention in general relates to elastomeric compositions comprising at least one elastomeric component, and at least two fillers, one of which is a wet skid enhancing filler.

Various specific embodiments of the present invention include the following, each of which include at least one elastomeric component and at least one wet skid enhancing filler and a second filler which preferably is a reinforcing filler.

In one embodiment, the composition contains:
a) at least one elastomeric component;
b) at least one wet skid enhancing filler with a Moh's hardness greater than about 4.5 and a BET surface area of less than about 100 $m^2/g$:
c) at least one reinforcing filler having a BET surface area of greater than or equal to about 80 $m^2/g$; and
d) at least one filler having a surface area of less than about 100 $m^2/g$, wherein b), c), and d) are different from each other.

In a second embodiment, the composition contains:

a) at least one elastomeric component;

b) at least one wet skid enhancing filler with a Moh's hardness greater than about 4.5 and a BET surface are of less than about 100 m$^2$/g, wherein said filler is a non-aluminum containing filler; and c) at least one reinforcing filler having a BET surface area of at least about 80 m$^2$/g, wherein said filler includes at least silica.

In a third embodiment, the composition contains:

a) at least one elastomeric component;

b) at least one wet skid enhancing filler with a Moh's hardness greater than about 4.5 and a BET surface area of less than about 100 m$^2$/g; and c) at least one filler selected from 1) an aggregate comprising a silicon-containing species phase and a carbon phase; 2) an aggregate comprising a metal-containing species phase and a carbon phase; 3) a carbon product having attached at least one organic group; or 4) a silica-coated carbon black or combinations thereof.

In a fourth embodiment, the composition contains:

a) at least one elastomeric compound;

b) at least one type of silica having a BET surface area of less than 40 m$^2$/g; and c) at least one reinforcing filler having a BET surface area of at least about 80 m$^2$/g.

In a fifth embodiment, the composition contains:

a) at least one elastomeric component;

b) at least one wet skid enhancing filler with a Moh's hardness of greater than about 4.5 and a BET surface area of less than about 100 m$^2$/g, wherein said filler is a non-aluminum and non-silica containing filler; and c) at least one reinforcing filler having a BET surface area of at least about 80 m$^2$/g.

With respect to any of the above-described compositions, the wet skid enhancing filler can be present in any amount. Preferably, this amount is sufficient to improve or increase the wet skid resistance of the resulting elastomeric compositoin as compared to the same elastomeric composition without the wet skid enhancing filler.

Depending on the desired properties of the compound, the wet skid enhancing filler is preferably present in an amount of from about 1 part by weight to about 60 parts by weight based on 100 parts by weight of the total amount of elastomeric compounds in the elastomeric composition (i.e., about 1 phr to about 60 phr), more preferably from about 10 parts by weight to about 40 parts by weight based on 100 parts by weight on the total amount of elastomeric components.

The at least one wet skid enhancing filler is a filler with a Moh's hardness greater than about 4.5 and typically has a BET surface area of less than about 100 m$^2$/g and more preferably less than about 80 m$^2$/g and even more preferably less than about 40 m$^2$/g. A preferred range is from about 5 m$^2$/g to less than about 100 m$^2$/g, and more preferably from about 10 m$^2$/g to about 60 m$^2$/g. The wet skid enhancing filler can be silica, SiC, and the like. Preferably, the wet skid enhancing filler is not an aluminum containing filler such as an aluminum hydroxide. In certain embodiments as set forth above, the wet skid enhancing filler is a wet skid enhancing filler other than silica and/or other than an aluminum containing filler, magnesium containing filler, or Ti-containing filler. The wet skid enhancing filler has the ability when present in an elastomeric composition to improve the wet skid resistance of the resulting elastomeric compositions. One or more different types of wet skid enhancing fillers can be used.

With respect to the at least one elastomeric component, any conventional elastomeric component(s) can be used. Elastomeric compositions which may be used with the wet skid enhancing fillers to form compositions according to the present invention may include elastomeric compositions comprising one ore more elastomeric components. It two or more elastomeric components are present in the elastomeric composition, the two or more elastomeric components may be blended, mixed, and/or cross-linked before or after the fillers are combined with the elastomeric component or components. Herein, the term "elastomeric component" is not limited to a single elastomer or rubber material, but may comprise two or more elastomers or rubbers mixed, blended, and/or cross-linked with one another.

Elastomeric compositions to which the fillers and filler blends may be added include, but are not limited to, natural rubber, styrene-butadiene rubber, polyisobutylene, polybutadiene, polyisoprene, polychloroprene, oil extended derivatives of such elastomers, or blends, mixtures, or copolymers thereof. The elastomeric composition may preferably comprise at least one polymer or copolymer derived from a diene-containing monomer. Preferred elastomeric compositions may comprise natural rubber; cis 1,4-polyisoprene; cis 3,4-polyisoprene; cis 1,4-polybutadiene, medium and high vinyl polybutadiene having a vinyl 1,2 content of from about 15% by weight to about 85% by weight; copolymers containing isoprene and butadiene; copolymers containing isoprene and a vinyl aromatic (e.g., styrene) monomer; copolymers containing butadiene and a vinyl aromatic monomer and optionally acrylonitrile; terpolymers containing isoprene, butadiene and a vinyl aromatic monomer; polymers produced by solution or emulsion polymerization processes; and polymers containing at least two monomers which may be random polymers or block polymers.

The composition may preferably comprise a diene-containing polymer and can further comprise a sulfur-containing or peroxide-containing crosslinking agent for crosslinking the diene-containing polymer.

In addition, the elastomeric composition may also contain: butyl rubber, halobutyl rubber (e.g., chlorobutyl or bromobutyl rubber); isobutylene polymerized with a vinyl aromatic monomer, e.g., preferably styrene, alpha methyl styrene, divinyl benzene, vinyl pyridine; isobutylene, methyl styrene, bromomethyl styrene terpolymers produced by the bromination of isobutylene/methyl styrene copolymer; ethylene, propylene and/or butylene homopolymers, copolymers and/or terpolymers; EPDM, i.e., ethylene, propylene, diene terpolymers where the diene is preferably selected from a substituted norbornene or hexadiene; ethylene copolymerized with vinyl acetate, acrylic acid, $C_1$ to $C_9$ alkyl acrylate, methacrylic acid or $C_1$ to $C_9$ alkyl methacrylate; styrene ethylene butylene polymers; hydrogenated nitrile polymers; and styrene acrylonitrile polymers.

The elastomeric composition preferably comprises a diene-containing polymer or another functional polymer. If the composition comprises a diene-containing polymer, the diene containing polymer can be any polymer satisfying this definition. Preferably, the diene containing polymer are polymers conventionally used in elastomeric compositions, especially diene containing polymers conventionally used in tire parts. Examples of diene containing polymers, include, but are not limited to, homo-, co-or ter-polymers of 1,3 butadiene, styrene, isoprene, chloroprene, isobutylene, 2,3-dimethyl-1,3-butadiene, acrylonitrile, ethylene, and propylene. Preferably, the elastomer has a glass transition temperature (Tg) as measured with a differential scanning colorimeter (DSC) ranging from about −120° C. to about 0° C. Examples include, but are not limited to, styrene-butadiene rubber (SBR), natural rubber, polybutadiene, polyisoprene, styrene-isoprene, and their oil extended derivatives. Blends of any of the foregoing may also be used.

Among the rubbers suitable for use with the present invention are natural rubber and its derivatives such as chlorinated rubber, epoxided natural rubbers, and synthetic rubbers such as: copolymers of from about 10 to about 70 percent by weight of styrene and from about 90 to about 30 percent by weight of butadiene such as a copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with a monomer copolymerized therewith such as styrene, methylstyrene, bromomethylstyrene, chloromethylstyrene, acrylonitrile, or 2-vinyl-pyridine.

Preferably, the elastomer has a glass transition point (Tg), as measured by DSC, between −120° C. and 0° C. Examples of such elastomers include poly(butadiene), poly(styrene-co-butadiene), and poly(isoprene).

A wide variety of elastomeric compositions may be used according to the present invention. The elastomeric compositions useful in the present invention, and the additive-loaded elastomeric compositions of the invention may be of such characteristics to provide a vulcanized composition, a thermoplastic vulcanizate, a thermoplastic elastomer, or a thermoplastic polyolefin. The thermoplastic vulcanizates, thermoplastic elastomers, and thermoplastic polyolefins preferably exhibit the ability to be extruded and molded several times without loss of performance characteristics.

With respect to the second filler or reinforcing filler present in the elastomeric compositions of the present invention, any conventional filler for elastomeric materials may be used, and reinforcing fillers are preferred. Preferably, the reinforcing filler has a BET surface area of at least about 80 m$^2$/g. Exemplary fillers which may be employed include, but are not limited to, carbon black, carbon black having attached at least one organic group, carbon black having attached at least one silanol group, silicon-treated carbon black, metal-treated carbon black, silicon-treated carbon black having attached at least one organic group, metal-treated carbon black having attached at least one organic group, silica-coated carbon black, silica-coated carbon black having attached at least one organic group, a metal oxide, a metal hydroxide, a metal oxide or hydroxide having attached at least one organic group, a silica aerogel, a metal silicate, a mixed metal silicate, a clay, a metal silicate clay, a kaolin, a talc, an alumina, an aluminum trihydroxide, a zinc oxide, a calcium carbonate, or a mixture thereof. Exemplary metal silicates which can be used as fillers include calcium silicate, aluminum silicate, magnesium silicate, calcium alumina silicate, and mixtures thereof. If a silica is used, the silica can be any type of silica and may preferably be any silica conventionally used in elastomeric compositions. The silica can be a precipitated silica, a fumed silica, or a modified silica such as a zinc-modified or aluminum-modified silica. The second filler is different from the wet skid enhancing filler in the elastomeric composition.

The "filler" as it is referred to herein, may function as a reinforcing filler and may contribute other desirable characteristics to the invention besides simply reinforcement. Herein, the phrase "reinforcing filler" refers to a filler which strengthens at least one elastomeric property of an elastomeric composition when added to the composition. Silicon treated carbon blacks and carbon blacks having attached at least one organic group are preferred. A carbon black having an attached organic group is described in PCT Publication No. WO 96/48688, and in U.S. Pat. Nos. 5,571,311; 5,630,868; 5,922,118; 5,900,029; 5,895,522; 5,851,280; and 5,554,739, all incorporated herein in their entireties by reference. Methods for preparing these modified carbon blacks with an attached organic group are also described in the aforementioned published application and patents. Preferably, the modified carbon black is a carbon black having an attached organic group wherein the organic group comprises an aromatic group which is preferably attached directly to the carbon black and sulfur.

The silicon-treated carbon black is an aggregate comprising a carbon phase and a silicon-containing species phase. A description of this aggregate as well as means of making this aggregate are described in U.S. Pat. Nos. 5,830,930, 5,869,550, 5,877,238, and 5,904,762, all of which are hereby incorporated in their entireties by reference.

A metal-treated carbon black may be used as one of the fillers and is a multi-phase aggregate comprising a carbon phase and metal-containing species phase wherein the metal-containing species can be or include one or more different metals such as magnesium, calcium, titanium, vanadium, cobalt, nickel, zirconium, tin, antimony, chromium, neodymium, lead, barium, cesium, iron, tungsten, molybdenum, aluminum, and zinc, and mixtures thereof. The aggregate comprising the carbon phase and a metal-containing species phase is described in U.S. patent application Ser. No. 08/828,785 filed Mar. 27, 1997, also herein incorporated in its entirety by reference.

Silica-coated black is described in U.S. Pat. No. 5,904,762, also incorporated in its entirety herein by reference.

If a silica is used as one of the reinforcing fillers, the silica can be any type of silica and may preferably be any silica used in conventional elastomeric compositions. The silica can be a precipitated silica, a fumed silica, or a modified silica such as a zinc-modified or aluminum-modified silica. Herein, the term "silica" also encompasses, but is not limited to, amorphous silica, vitreous silica, fused silica, silicates (e.g., alumina silicates) and other silicon or silica-containing fillers such as clay, talc, wollastonite, and the like. However, the silica should have a surface area of at least about 80 m$^2$/g and preferably greater than 100 m$^2$/gm, to reinforce the compound. Silicas are commercially available from such sources as Cabot Corporation under the Cab-O-Sil® tradename, PPG Industries under the HI-SIL and CEPTANE tradenames, Rhone-Poulenc under the ZEOSIL tradename, and Degussa AG under the ULTRASIL and COUPSIL tradenames.

Preferred filler combinations are blends of wet skid enhancing fillers with either a) conventional reinforcing silica with a surface area greater than 100 m$^2$/gm b) silicon treated carbon black c) a chemically modified carbon black with sulfur containing groups d) pre-modified silica using a coupling agent or e) pre-modified silicon treated carbon black with a coupling agent.

In addition to the wet skid enhancing filler, reinforcing filler, and elastomeric component or components, the elastomeric compositions of the present invention may contain one or more curing agents, coupling agents, processing aids, oil extenders, antidegradants, coumarin indenes, hydrocarbon resins, other resins, resin esters, and/or other conventional ingredients.

The elastomeric compositions may include one or more curing agents such as, for example, sulfur, sulfur donors, activators, accelerators, peroxides, and other systems used to effect crosslinking of the elastomeric composition. Preferred curing agents will depend on what elastomeric component or components are sought to be crosslinked.

If a coupling agent is present in the composition, the coupling agent may comprise a dual functional or multi-functional silane coupling agent. The coupling agent may be used to couple the additive agent to the elastomeric component, as occurs, for example, when a bis(triethoxypropyl)tetrasulfide coupling agent is used. The composition may include a coupling agent for coupling the additive agent, the elastomeric component, and the reinforcing filler to one another. The coupling agents mentioned in U.S. Pat. Nos. 5,663,395; 5,652,310; 5,440,064; and 5,468,893 can be used, and these patents are incorporated herein in their entireties by reference.

The fillers, additive agent, and other additive materials that, together with the elastomeric component, make up the elastomeric composition can be present in any amount so long as the amount and type of each is compatible with the remainder of the elastomeric composition.

The total amount of filler present in the elastomeric composition can be any amount conventionally used in elastomeric compositions. Preferably, the reinforcing filler is present in an amount of at least about 20 phr, more preferably at least about 30 phr, and even more preferably at least about 40 phr. Preferred ranges for a reinforcing filler are from about 20 phr to about 200 phr, and more preferably from about 40 phr to about 120 phr.

If a coupling agent is present in the elastomeric composition of the present invention, the coupling agent can be present in any conventional amount. Preferably, the amount of coupling agent present in the elastomeric composition is less than about 15 parts by weight and more preferably less than about 10 parts by weight based on 100 parts by weight of filler.

With respect to the increase in wet skid resistance, preferably the wet skid resistance, as compared to the wet skid resistance in an otherwise identical elastomeric composition containing no wet skid enhancing filler, is increased at least 2%, more preferably at least 5%, and most preferably at least 10%. Further, it is preferred that the wet skid resistance increases from about 2% to about 25%, for example, from about 2% to about 15% compared to an otherwise identical elastomeric composition containing no such wet skid enhancing filler.

The present invention also relates to a method of making the above-described elastomeric compositions by compounding, reacting, mixing, polymerizing or otherwise If combining at least one diene containing polymer with the blend of fillers and additive agent(s) in the amounts described earlier.

The wet skid enhancing filler can be added at any stage while the elastomeric composition is being prepared. Preparation of the elastomeric compositions of the present invention can involve beginning with the elastomeric component or components and adding thereto the other ingredients, for example, the fillers and additive agent. Alternatively, materials such as the filler can be preliminarily combined with the elastomeric component or components, for example, a diene-containing polymer, or the filler can be preliminarily combined with the additive agent and optionally coupling agents before being added to the elastomeric component or components.

According to the present invention, any conventional mixing procedure can be used to combine the components or ingredients of the composition. The fillers can be added in any order or can be added simultaneously. The mixture of components is preferably thermomechanically mixed together at a temperature within the range of from about 120° C. to about 180° C.

If the composition includes a coupling agent, the coupling agent may be added before, during, or after addition of the filler to the elastomeric component or composition. If the elastomeric composition contains a coupling agent and a filler, the coupling agent is preferably first reacted with the filler prior to mixing or reacting the filler with the elastomeric component or composition.

The compositions may be useful in the manufacture of elastomeric materials and/or articles, such as tires or portions thereof, hoses, belts, wiper blades, seals, gaskets, footwear, mats, and profile extrudates.

The present invention will be further exemplified by reference to the following examples, which are intended to illustrate, not limit, the invention.

EXAMPLES

In the examples below, the elastomer compositions were prepared according to the formulation presented in the Table 1. In all examples, numerical values given are in parts by weight unless indicated otherwise.

TABLE 1

| | Formulation | | | |
|---|---|---|---|---|
| | N234 | CSDPF | Ex. 1–7 | Ex. 8–13 |
| SSBR (Duradene 715) | 75 | 75 | 75 | 75 |
| BR (Tacktene 1203) | 25 | 25 | 25 | 25 |
| N234 | 72 | — | — | — |
| CRX 2000 | — | — | Variable | |
| Variable | | | | |
| Silica | — | — | Variable | — |
| Silicon Carbide | — | — | — | |
| Varable | | | | |
| Si 69 | — | 2.4 | Variable | |
| Variable | | | | |
| Oil (Sundex 8125) | 28 | 28 | 28 | 28 |
| Zinc Oxide | 3.5 | 3.5 | 3.5 | 3.5 |
| Stearic Acid | 2 | 2 | 2 | 2 |
| Antioxident (Flexzone 7P) | 1.5 | 1.5 | 1.5 | 1.5 |
| Wax (Sunproof Improved) | 1.5 | 1.5 | 1.5 | 1.5 |
| Durax ® | 1.35 | 1.5 | 1.5 | 1.5 |
| Vanax ® DPG | -0.5 | 0.5 | 0.5 | |
| Benzyl Tuex | 0.4 | 0.4 | 0.4 | 0.4 |
| Sulfur | 1.4 | 1.4 | 1.4 | 1.4 |

Duradene 715—solution SBR is obtained from Firestone Synthetic Rubber & Latex Co., Akron, Ohio; Tacktene 1203—Polybutadiene, from Bayer Fibres, Akron, Ohio; Si 69 —bis(3-triethoxysilylpropyl) tetrasulfide, from Degussa AG, Germany; Sundex 8125—oil, from R. E. Carrol Inc., Trenton, N.J.; Zinc oxide—from New Jersey Zinc Co., New Jersey; Stearic acid—from Emery Chemicals, Cincinnati, Ohio; Flexon 7P—antioxidant, N-(1,3,-dimethyl butyl)-N'-phenyl-p-phenylene diamine, from Uniroyal Chemical Co. Middlebury, CT; Sunproof Improved—wax, from Uniroyal Chemical Co. Middlebury, Conn.; Durax—accelerator, N-cyclohoeane-2-benzothiazole sulphenamide, from R. T. Vanderbilt Co., Norwalk, Conn.; Benzyl Tuex—accelerator, tetrabenzyl thiuram disulfide, from Uniroyal Chemical Co. Middlebury, Conn.; Silica Z1165 was obtained from Rhône-Poulenc, silica HiSil 532 and Silene 732D were obtained from PPG Industries, Pittsburgh, Pa.; Silicon carbide (SiC PT8026J (surface area 31.9 $m^2/g$) and BPT8044-1 (surface area 55.9 $m^2/g$)) were obtained from Nanomaterials research Corporation, Longmont, Colo.

The elastomer compositions were prepared according to the mixing procedure presented in Table 2:

TABLE 2

Mixing Procedure for Tread Compounds of Passenger Tire

| Stage 1 (min.) | Brabender Plasti-corder EPL-V. |
|---|---|
| | 60 rpm, 80° C., air on, start all mixes @ 100° C. |
| 0' | Add polymer |
| 1' | Add filler, coupling agents (Preblended) |
| @160° C. | Add oil. |
| 7' @165° C. | Dump. |
| | Pass through open mill 3 times. |
| | Sit at room temperature for at least 2hrs. |
| Stage 2 | 60 rpm, 80° C., air on, start all mixes @ 100° C. |
| 0' | Add masterbatch from stage 1. |
| 1' | Add ZnO, Stearic acid. |
| 3' | Add Flexzone 7P and Wax. |
| 4', @165° C. | Dump |
| | Pass through open mill 3 times. |
| | Sit at room temperature for at least 2hrs. |
| Stage 3 | 35 rpm, 80° C. air on, start all mixes @ 100° C. |
| 0' | Add masterbatch from stage 2. |
| 1' | Add curatives. |
| 2' | Dump. |
| | Pass through open mill 3 times. |

TABLE 3

Performance Data

| | N234 | CRX 2000/ Si69 | Silica Z1165/ Si69 | Silica HiSil 532/ Si69 | Silica Silene 732D/Si69 | BPST % | Abrasion 14% | Tan $\delta_{max}$ 70° C. | Observation |
|---|---|---|---|---|---|---|---|---|---|
| A | 72 | | | | | 100 | 100 | 0.255 | |
| B | | 72/2.4 | | | | 101 | 106 | 0.165 | |
| Ex 1 | | 54 | 21/3.5 | | | 102 | 105 | 0.162 | Equal loading |
| Ex 2 | | 54 | | 21/2.4 | | 109 | 97 | 0.135 | Equal loading |
| Ex 3 | | 54 | | 50/3.3 | | 107 | 113 | 0.158 | Equal inter.area |
| Ex 4 | | 63 | | 26/2.9 | | 105 | 148 | 0.156 | |
| Ex 5 | | 54 | | | 21/2.4 | 105 | 64 | 0.138 | Equal loading |
| Ex 6 | | 63 | | | 29/2.6 | 103 | 87 | 0.156 | |
| Ex 7 | | 63 | | | 43/2.9 | 105 | 79 | 0.166 | Equal inter.area |

TABLE 4

Performance Data

| | N234 | CRX 2000/ Si69 | SiC BPT8044-1Si69 | SiC PT8026J/ Si69 | BPST % | Abrasion 14% | tan $\delta_{max}$ 70° C. |
|---|---|---|---|---|---|---|---|
| A | 72 | | | | 100 | 100 | 0.255 |
| B | | 72/2.4 | | | 101 | 106 | 0.165 |
| Ex 8 | | 63 | 18/2.6 | | 104 | 66 | 0.154 |
| Ex 9 | | 63 | 27/2.9 | | 106 | 62 | 0.161 |
| Ex 10 | | 54 | 32/2.7 | | 109 | 49 | 0.140 |
| Ex 11 | | 54 | 27/2.6 | | 109 | 46 | 0.134 |
| Ex 12 | | 63 | | 32/2.8 | 107 | 52 | 0.148 |
| Ex 13 | | 54 | | 32/2.5 | 110 | 44 | 0.126 |

Dynamic properties were determined using Rheometrics Dynamic Spectrometer II (RDS II, manufactured by Rheometrics Inc., N.J.) with strain sweep. The measurements were made at 70° C. with strain sweeps over a range of double strain amplitudes for 0.2% to 120%. The maximum tan delta values on the strain sweep were taken. Wet skid resistance was measured using a British Portable Skid Tester according to ASTM E303; the result was referenced to the wet skid resistance of the Comparative Sample being set as 100. Abrasion measurements were made using a Cabot abrader which is based on a Lambourn-type machine as described in U.S. Pat. No. 4,995,197. The apparatus was run at 14% slip.

The fillers used in the examples have the following characteristic properties for surface area and hardness:

TABLE 5

| | BET ($N_2$) SA, $m^2/g$ | Mohs' hardness |
|---|---|---|
| N234 | 122 | 2~4 |
| CRX 2000 | 154 | NA |
| HiSil 532 | 60 | 7 |
| Silene 732D | 35 | 7 |
| SiC BPT8044-1 | 55.9 | 9~10 |
| SiC PT8026J | 31.9 | 9~10 |

CRX 2000 was made using a multi-stage reactor and a process described in U.S. Pat. Nos. 5,877,238 and 5,830,930, which are herein incorporated in its entirety by reference.

It is seen from Table 3, that when 21 phr of Z 1165 is replaced by 21 phr of HiSil 532, the skid resistance improves by 7%. Similar improvement is made using Silene 732D. However, the improvement in skid is slightly higher with HiSil 532 than with Silene 732D.

Other embodiments of the present invention will be apparent to those skilled in the art from consideration of the specification and practice of the present invention disclosed herein. It is intended that the specification and examples be considered as exemplary only, with a true scope of the present invention being indicated by the following claims.

What is claimed is:

1. A composition comprising:

a) at least one elastomeric component;

b) at least one filler with a Moh's hardness greater than about 4.5 and a BET surface area of less than 40 $m^2/g$;

c) at least one reinforcing filler having a BET surface area of greater than or equal to about 80 $m^2/g$; and d) at least one filler having a surface area of less than about 100 $m^2/g$, wherein b), c), and d) are different from each other.

2. The composition of claim 1, wherein fillers b), c), and d) are different with respect to the type of filler.

3. The composition of claim 1, wherein said b), c), and d) are different with respect to surface area.

4. The composition of claim 1, wherein said b) filler is silica.

5. The composition of claim 1, wherein said c) filler is carbon black.

6. A composition comprising:
a) at least one elastomeric component;
b) at least one filler with a Moh's hardness greater than about 4.5 and a BET surface area of less than 40 m$^2$/g, wherein said filler is a non-aluminum containing filler; and
c) at least one filler having a BET surface area of at least about 80 m$^2$/g, wherein said filler includes at least silica.

7. The composition of claim 6, wherein said b) filler is silica.

8. The composition of claim 6, wherein said b) filler is SiC.

9. The composition of claim 6, wherein said c) filler is carbon black.

10. A composition comprising:
a) at least one elastomeric component;
b) at least one filler with a Moh's hardness greater than about 4.5 and a BET surface area of less than 40 m$^2$/g;
c) at least one filler selected from 1) an aggregate comprising a silicon-containing species phase and a carbon phase; 2) an aggregate comprising a metal-containing species phase and a carbon phase; 3) a carbon product having attached at least one organic group; or 4) a silica-coated carbon black or combinations thereof.

11. The composition of claim 10, wherein said b) filler is silica.

12. A composition comprising:
a) at least one elastomeric component;
b) at least one type of silica having a BET surface area of less than 40 m$^2$/g; and
c) at least one filler having a BET surface area of at least about 80 m$^2$/g.

13. The composition of claim 12, wherein said c) filler is carbon black.

14. A composition comprising:
a) at least one elastomeric component;
b) at least one filler with a Moh's hardness of greater than about 4.5 and a BET surface area of less than 40 m$^2$/g, wherein said filler is a non-aluminum and non-silica containing filler; and
c) at least one filler having a BET surface area of at least about 80 m$^2$/g.

15. The composition of claim 14, wherein said b) filler is SiC and said c) filler is carbon black or silica or both.

16. The composition of claim 1, wherein said elastomeric component comprises at least one monomer selected from a butadiene monomer, an isoprene monomer, a chloroprene monomer, combinations thereof, or reaction products thereof.

17. The composition of claim 1, wherein said reinforcing filler comprises carbon black or a blend of carbon black and silica in a weight ratio of from about 5:95 to about 95:5.

18. A tire component comprising the composition of claim 1.

19. The composition of claim 6, wherein said b) filler has a BET surface area of from about 10 to about 60 m$^2$/g.

20. The composition of claim 6, wherein said c) filler comprises carbon black or a blend of carbon black and silica in a weight ratio of from about 5:95 to about 95:5.

21. A tire component comprising the composition of claim 6.

22. The composition of claim 6, wherein said elastomeric component comprises at least one monomer selected from a butadiene monomer, an iosprene monomer, a chloroprene monomer, combinations thereof, or reaction products thereof.

23. A method of improving the wet skid resistance of an elastomeric composition, said method comprising combining together:
a) at least one elastomeric component;
b) at least one wet skid enhancing filler with a Moh's hardness greater than about 4.5 and a BET surface area of less than 40 m$^2$/g;
c) at least one reinforcing filler having a BET surface area of greater than or equal to about 80 m$^2$/g; and
d) at least one filler having a surface area of less than about 100 m$^2$/g, wherein b), c), and d) are different from each other, to form a wet skid resistant elastomeric composition, wherein the wet skid resistance of said wet skid resistant elastomeric composition is increased compared to said elastomeric composition without said wet skid enhancing filler.

24. The method of claim 23, wherein the wet skid resistance is at least about 2% greater than said elastomeric composition without said agent.

25. The method of claim 23, wherein the wet skid resistance is at least about 10% greater than said elastomeric composition without said agent.

26. The method of claim 23, further comprising forming said wet skid resistant elastomeric composition into an article of manufacture and subsequently vulcanizing said wet skid resistant composition.

27. The method of claim 23, wherein said forming comprises forming said wet skid resistant elastomeric composition into a tire component.

28. A method of improving the wet skid resistance of an elastomeric composition, said method comprising combining together:
a) at least one elastomeric component;
b) at least one wet skid filler with a Moh's hardness greater than about 4.5 and a BET surface area of less than 40 m$^2$/g, wherein said filler is a non-aluminum containing filler; and
c) at least one reinforcing filler having a BET surface area of at least about 80 m$^2$/g, wherein said filler includes at least silica, wherein the wet skid resistance of said wet skid resistant elastomeric composition is increased compared to said elastomeric composition without said wet skid enhancing filler.

29. The method of claim 28, further comprising forming said wet skid resistant elastomeric composition into an article of manufacture and subsequently vulcanizing said wet skid resistant elastomeric composition.

30. The method of claim 28, wherein said forming comprises forming said wet skid resistant elastomeric composition into a tire component.

31. A method of improving the wet skid resistance of an elastomeric composition said method comprising combining together:
a) at least one elastomeric component;
b) at least one wet skid enhancing filler with a Moh's hardness greater than about 4.5 and a BET surface area of less than 40 m$^2$/g;
c) at least one filler selected from 1) an aggregate comprising a silicon-containing species phase and a carbon phase; 2) an aggregate comprising a metal-containing species phase and a carbon phase; 3) a carbon product having attached at least one organic group; or 4) a silica-coated carbon black or combinations thereof, wherein the wet skid resistance of said wet skid resistant elastomeric composition is increased compared to said elastomeric composition without said wet skid enhancing filler.

32. The method of claim 31, wherein the wet skid resistance is at least about 2% greater than said elastomeric composition without said agent.

33. The method of claim 31, wherein the wet skid resistance is at least about 10% greater than said elastomeric composition without said agent.

34. The method of claim 31, further comprising forming said wet skid resistant elastomeric composition into an article of manufacture and subsequently vulcanizing said wet skid resistant elastomeric composition.

35. The method of claim 31, wherein said forming comprises forming said wet skid resistant composition into a tire component.

36. A method of improving the wet skid resistance of an elastomeric composition, said method comprising combining together:
a) at least one elastomeric component;
b) at least one type of silica having a BET surface area of less than 40 m$^2$/g; and
c) at least one reinforcing filler having a BET surface area of at least about 80 m$^2$/g, wherein the wet skid resistance of said wet skid resistant elastomeric composition is increased compared to said elastomeric composition without said reinforcing filler.

37. The method of claim 36, wherein the wet skid resistance is at least about 2% greater than said elastomeric composition without said agent.

38. The method of claim 36, wherein the wet skid resistance is at least about 10% greater than said elastomeric composition without said agent.

39. The method of claim 36, further comprising forming said wet skid resistant elastomeric composition into an article of manufacture and subsequently vulcanizing said wet skid resistant elastomeric composition.

40. The method of claim 36, wherein said forming comprising forming said wet skid resistant elastomeric composition into a tire component.

41. The composition of claim 1, wherein said elastomeric component comprises unmodified natural rubber, styrene-butadiene rubber, styrene-isoprene rubber, polyisobutylene, polybutadiene, polyisoprene, polychloroprene, or homo-, co-or ter-polymers of 1,3 butadiene, styrene, isoprene, chloroprene, isobutylene, 2,3-dimethyl-1,3-butadiene, acrylonitrile, ethylene, or propylene, or oil extended derivatives thereof, or blends, mixtures, or random, block or copolymers thereof.

42. The composition of claim 6, wherein said elastomeric component comprises unmodified natural rubber, styrene-butadiene rubber, styrene-isoprene rubber, polyisobutylene, polybutadiene, polyisoprene, polychloroprene, or homo-, co-or ter-polymers of 1,3 butadiene, styrene, isoprene, chloroprene, isobutylene, 2,3-dimethyl-1,3-butadiene, acrylonitrile, ethylene, or propylene, or oil extended derivatives thereof, or blends, mixtures, or random, block or copolymers thereof.

43. The composition of claim 10, wherein said elastomeric component comprises unmodified natural rubber, styrene-butadiene rubber, styrene-isoprene rubber, polyisobutylene, polybutadiene, polyisoprene, polychloroprene, or homo-, co-or ter-polymers of 1,3 butadiene, styrene, isoprene, chloroprene, isobutylene, 2,3-dimethyl-1,3-butadiene, acrylonitrile, ethylene, or propylene, or oil extended derivatives thereof, or blends, mixtures, or random, block or copolymers thereof.

44. The composition of claim 12, wherein said elastomeric component comprises unmodified natural rubber, styrene-butadiene rubber, styrene-isoprene rubber, polyisobutylene, polybutadiene, polyisoprene, polychloroprene, or homo-, co-or ter-polymers of 1,3 butadiene, styrene, isoprene, chloroprene, isobutylene, 2,3-dimethyl-1,3-butadiene, acrylonitrile, ethylene, or propylene, or oil extended derivatives thereof, or blends, mixtures, or random, block or copolymers thereof.

45. The composition of claim 14, wherein said elastomeric component comprises unmodified natural rubber, styrene-butadiene rubber, styrene-isoprene rubber, polyisobutylene, polybutadiene, polyisoprene, polychloroprene, or homo-, co-or ter-polymers of 1,3 butadiene, styrene, isoprene, chloroprene, isobutylene, 2,3-dimethyl-1,3-butadiene, acrylonitrile, ethylene, or propylene, or oil extended derivatives thereof, or blends, mixtures, or random, block or copolymers thereof.

46. The method of claim 23, wherein said elastomeric component comprises unmodified natural rubber, styrene-butadiene rubber, styrene-isoprene rubber, polyisobutylene, polybutadiene, polyisoprene, polychloroprene, or homo-, co-or ter-polymers of 1,3 butadiene, styrene, isoprene, chloroprene, isobutylene, 2,3-dimethyl-1,3-butadiene, acrylonitrile, ethylene, or propylene, or oil extended derivatives of such elastomers, or blends, mixtures, or random, block or copolymers thereof.

47. The method of claim 28, wherein said elastomeric component comprises unmodified natural rubber, styrene-butadiene rubber, styrene-isoprene rubber, polyisobutylene, polybutadiene, polyisoprene, polychloroprene, or homo-, co-or ter-polymers of 1,3 butadiene, styrene, isoprene, chloroprene, isobutylene, 2,3-dimethyl-1,3-butadiene, acrylonitrile, ethylene, or propylene, or oil extended derivatives of such elastomers, or blends, mixtures, or random, block or copolymers thereof.

48. The method of claim 31, wherein said elastomeric component comprises unmodified natural rubber, styrene-butadiene rubber, styrene-isoprene rubber, polyisobutylene, polybutadiene, polyisoprene, polychloroprene, or homo-, co-or ter-polymers of 1,3 butadiene, styrene, isoprene, chloroprene, isobutylene, 2,3-dimethyl-1,3-butadiene, acrylonitrile, ethylene, or propylene, or oil extended derivatives thereof, or blends, mixtures, or random, block or copolymers thereof.

49. The method of claim 36, wherein said elastomeric component comprises unmodified natural rubber, styrene-butadiene rubber, styrene-isoprene rubber, polyisobutylene, polybutadiene, polyisoprene, polychloroprene, or homo-, co-or ter-polymers of 1,3 butadiene, styrene, isoprene, chloroprene, isobutylene, 2,3-dimethyl-1,3-butadiene, acrylonitrile, ethylene, or propylene, or oil extended derivatives thereof, or blends, mixtures, or random, block or copolymers thereof.

* * * * *